US011857479B1

(12) United States Patent
Johnson

(10) Patent No.: US 11,857,479 B1
(45) Date of Patent: Jan. 2, 2024

(54) BEDPAN LINER WITH DRAWSTRING

(71) Applicant: Sylvia Johnson, Mobile, AL (US)

(72) Inventor: Sylvia Johnson, Mobile, AL (US)

( * ) Notice: Subject to any disclaimer, the term of this patent is extended or adjusted under 35 U.S.C. 154(b) by 0 days.

(21) Appl. No.: 17/719,592

(22) Filed: Apr. 13, 2022

(51) Int. Cl.
*A61G 9/00* (2006.01)

(52) U.S. Cl.
CPC .................................... *A61G 9/003* (2013.01)

(58) Field of Classification Search
CPC ...................................................... A61G 9/003
See application file for complete search history.

(56) References Cited

U.S. PATENT DOCUMENTS

| | | | | | |
|---|---|---|---|---|---|
| 3,061,840 | A * | 11/1962 | Presseisen | A61G 9/003 4/456 |
| 4,833,742 | A * | 5/1989 | Kuhn | A61G 7/02 5/604 |
| D354,342 | S * | 1/1995 | Marshall-Smith | D23/309 |
| 5,394,571 | A * | 3/1995 | Vernon | A61G 9/003 4/456 |
| 5,778,458 | A | 7/1998 | Speelman | |
| 6,532,605 | B1 | 3/2003 | Howell | |
| 10,165,909 | B2 * | 1/2019 | Tanguay | A47K 11/02 |
| 2002/0049416 | A1 * | 4/2002 | Savoia | A47K 11/04 604/327 |
| 2006/0162059 | A1 * | 7/2006 | Georgieva | A61G 9/006 4/484 |
| 2010/0125951 | A1 * | 5/2010 | Stefano | A61G 7/02 5/604 |
| 2014/0109287 | A1 * | 4/2014 | Ramirez | A42B 1/04 2/84 |
| 2017/0290724 | A1 * | 10/2017 | Rojas | A61G 9/003 |

FOREIGN PATENT DOCUMENTS

| | | | | |
|---|---|---|---|---|
| WO | WO2007046961 | * | 4/2007 | A61G 9/003 |

OTHER PUBLICATIONS

Oxford Learner's Dictionaries. "Seam". Available since at least Jun. 13, 2014. <https://www.oxfordlearnersdictionaries.com/us/definition/english/seam>. (Year: 2014).*

* cited by examiner

*Primary Examiner* — David P Angwin
*Assistant Examiner* — Nicholas A Ros
(74) *Attorney, Agent, or Firm* — Sanchelima & Assocaites PA; Christian Sanchelima; Jesus Sanchelima

(57) ABSTRACT

A bedpan liner with drawstring including a liner assembly, a conduit assembly, and a drawstring assembly. The bedpan liner is a flexible liner The bedpan liner has a shape that conforms to the shape of a bedpan. The liner assembly includes an upper portion and a lower portion. The lower portion is used as a waste compartment. The conduit assembly includes a conduit, a first opening and a second opening. The drawstring assembly includes a drawstring. The drawstring is inserted into said first or second opening and goes through the conduit. The drawstring emerges from the first opening and second opening of the edge portion. The drawstring surrounds the edge of the bedpan liner. The conduit slidably contracts along said drawstring to close said liner to secure the bedpan liner during removal and disposal.

1 Claim, 3 Drawing Sheets

BEDPAN LINER WITH DRAWSTRING

BACKGROUND OF THE INVENTION

1. Field of the Invention

The present invention relates to a bedpan liner with drawstring and, more particularly, to a bedpan liner that allows to easy dispose waste from a bedpan.

2. Description of the Related Art

Several designs for a bedpan liner with drawstring have been designed in the past. None of them, however, include a drawstring to secure the liner closed during disposal.

Applicant believes that a related reference corresponds to U.S. Pat. No. 6,532,605 issued for a disposable liner for use with bedpans. Applicant believes that another related reference corresponds to U.S. Pat. No. 5,778,458 issued for a disposable bedpan liner. None of these references, however, teach of a disposable bedpan liner that is comprised of a flexible liner that is shaped to fit within a bedpan and has drawstrings attached to the upper edge that is used to secure the liner closed during removal and disposal.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a bedpan liner with drawstring that includes a fragrance to avoid odor.

It is another object of this invention to provide a bedpan liner with drawstring that includes a liner to prevent the bedpan from being a source of infection by keeping the bedpan clean.

It is still another object of the present invention to provide a bedpan liner with drawstring that includes a drawstring to secure the liner to the bedpan.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an isometric operational view of the present invention 10 wherein a user is changing the bedpan liner.
Figure 2:
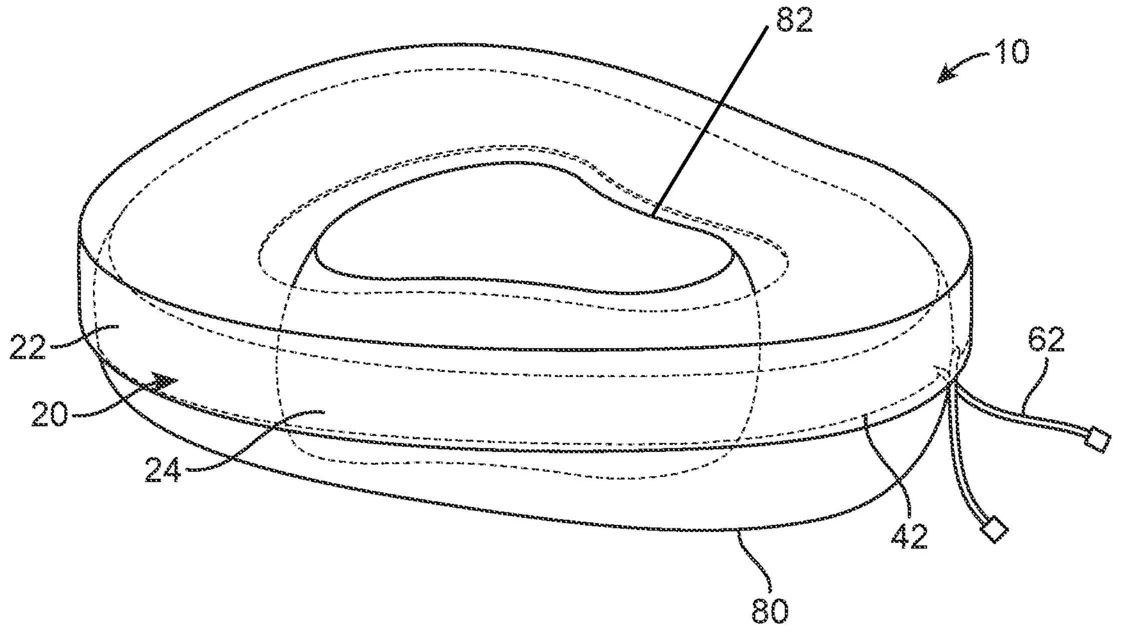
FIG. 2 shows an isometrical view of present invention 10 including a liner assembly. The liner assembly 20 includes an upper portion 22 and a lower portion 24.
Figure 3:
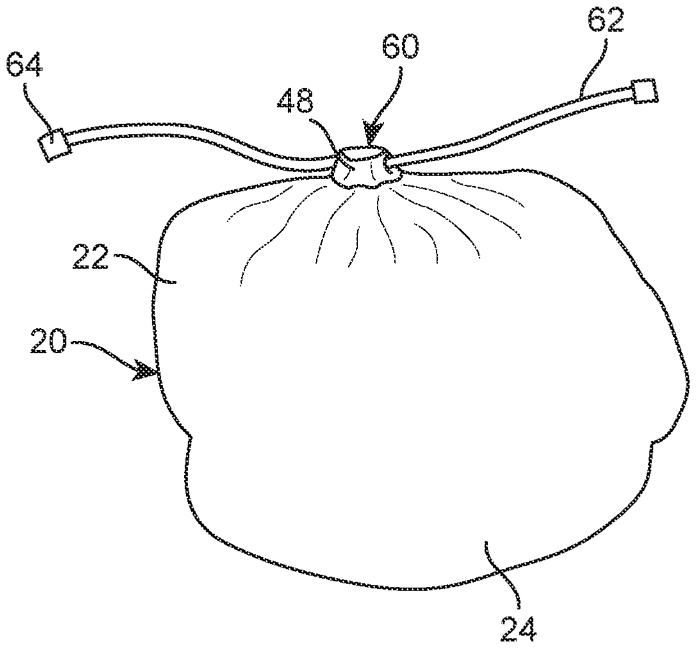
FIG. 3 illustrates a frontal view of the present invention 10 closed with the conduit 48 contracted by means of drawstring 62.

Referring now to the drawings, where the present invention is generally referred to with numeral 10, it can be observed that it basically includes a liner assembly 20, a conduit assembly 40 and a drawstring assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The liner assembly 20 may include an upper portion 22 and a lower portion 24. In a preferred embodiment the upper portion 22 and the lower portion 24 of the liner assembly 20 may be made of biodegradable Low-Density Polyethylene (LDPE). It also may be suitable for the upper portion 22 and the lower portion 24 of the liner assembly 20 to be made of polyvinyl chloride (PVC), cloth or any other flexible and resistant material. In a preferred embodiment the width of the upper portion 22 may be larger than the width of the lower portion 24. The upper potion 22 and the lower portion 24 may be continuous defining a liner. The thickness of the liner assembly 20 may be enough to receive and support wastes of a user without leaking.

The liner assembly 20 may have a shape such that fits within a bedpan 80. The lower portion 24 may be fitted into the bedpan 80 through the opening 82. In a preferred embodiment the opening 82 may have a circular shape. It also may be suitable for the opening 82 to have a rectangular shape, an ovoid shape, or any other suitable shape. The sidewalls of the bedpan 80 may have a profile of a convex arc. It also may be suitable for the sidewalls of the bedpan 80 to have any other suitable shape such as a rectangular shape, a polygon shape, an irregular shape, or the like. The sidewalls of the bedpan 80 may be defined for a bottom wall of the bedpan 80 defining a container. The bottom wall of the bedpan 80 may have a circular shape, a rectangular shape, or any other suitable shape. The bottom of the lower portion 24 may be in constant abutting contact with the bottom wall of the bedpan 80. The sides of the lower portion 24 may be in constant abutting contact with the sidewalls of the bedpan 80. In a preferred embodiment the lower portion 24 may have a shape substantially equal to the inside of the bedpan 80. The upper portion 22 may cover the uppermost end of the bedpan 80. In a preferred embodiment the upper portion 22 may partially cover the sides of the bedpan 80.

In an alternative embodiment the liner assembly 20 may have fragrances such as jasmine fragrance, cinnamon fragrance, or fruit fragrance to avoid odor of the waste. The fragrance may be sprayed to the bedpan liner 10. It also may be suitable to add the fragrance when manufacturing the material from which the liner assembly 20 is made of. It also may be suitable for the liner assembly 20 that only the lower portion 24 have fragrances such as jasmine fragrance, cinnamon fragrance, or fruit fragrance to avoid odor of the waste.

Figure 4:
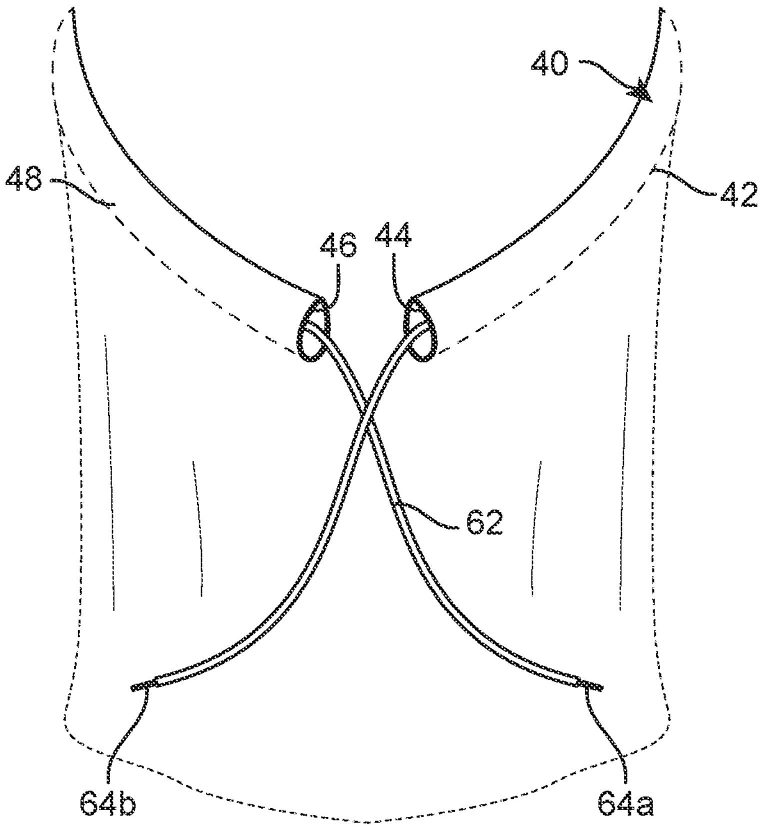
FIG. 4 illustrates an enlarged view of the conduit assembly 40. The conduit assembly 40 includes a union 42, a first opening 46, a second opening 46 and a conduit 48.

Referring now to FIG. 4, the conduit assembly 40 may include a union 42, a first opening 44 and a second opening 46. The union 42 may connect the edges of the upper portion 22 with the outer sides of the upper portion 22 defining a conduit 48. In a preferred embodiment the union 42 may be a seam. The conduit 48 may perimeterly surround the edges of the upper portion 22. The conduit 48 may be hollow. In a preferred embodiment the conduit 48 may have a toroid shape. It also may be suitable for the conduit 48 to have a rectangular shape, a triangular shape, or any other suitable shape. The conduit 48 may have a first opening 44 and a second opening 46.

The drawstring assembly 60 may include a drawstring 62, a first aglet 64*a* and a second aglet 64*b*. In a preferred embodiment the drawstring 62 may be made of plastic. It also may be suitable for the drawstring 62 to be made of cloth, hemp yarn, or any other resistant material. In a preferred embodiment the drawstring 62 may be elongated and planar. It also may be suitable for the drawstring 62 to be cylindrical. The drawstring 62 may have two distal ends. It may be suitable to insert one of the distal ends of the drawstring 62 into the first aglet 64*a*. It may be suitable to insert the another distal ends of the drawstring 62 into the second aglet 64*b*.

In a preferred embodiment the first aglet 64*a* may have a rectangular shape. It also may be suitable for the first aglet 64*a* to have a circular shape, a rectangular shape, an ovoid shape, a triangular shape, or any other suitable shape. The first aglet 64*a* may have an opening where a distal end of the drawstring 62 is inserted. In a preferred embodiment the first aglet 64*a* may be made of biodegradable plastic. It also may be suitable for the first aglet 64*a* to be made of metal, bamboo, or any other resistant material. In a preferred embodiment the second aglet 64*b* may have a rectangular shape. It also may be suitable for the second aglet 64*b* to have a circular shape, a rectangular shape, an ovoid shape, a triangular shape, or any other suitable shape. In a preferred embodiment the second aglet 64*b* may be made of biodegradable plastic. It also may be suitable for the second aglet 64*b* to be made of metal, bamboo, or any other resistant material The second aglet 64*a* may have an opening where the other distal end of the drawstring 62 is inserted. Optionally, the drawstring 62 may be a double drawstring or a triple drawstring.

In a preferred embodiment a distal end of the drawstring 62 is inserted into the first opening 46 going through the conduit 48. It also may be suitable for the distal end of the drawstring 62 to be inserted into the second opening 44. In a preferred embodiment the drawstring 62 may be partially inside of the conduit 48. In a preferred embodiment the distal ends of the drawstring 62, the first aglet 64 and the second aglet 24*b* may be exposed to be manipulate for a user. In a preferred embodiment the conduit 48 is retractable. In a preferred embodiment the conduit 48 contracts slidably through the drawstring 62 to close the bedpan liner 10. In an alternative embodiment the drawstring may perimeterly surround the edges of the upper portion 22 to tie the bedpan liner 10. The drawstring 62 may be configurated to make an overhead bow knot, a sheet bend knot, a slipknot knot, or any other knot that allows to correctly tie the bedpan liner 10. The first aglet 64*a* and the second aglet 64*b* may help to avoid the knot to untie.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bedpan liner with drawstring, consisting of:

a liner assembly including a liner, wherein said liner is configured to conform to the shape of a bedpan, said liner has a lower portion and an upper portion, said lower portion has a width narrower than a width of said upper portion, said upper portion is configured to cover an uppermost end of said bedpan, said liner is made of Polyvinyl Chloride, said liner is configured to fit into an opening of said bedpan, said lower portion of said liner is configured to receive waste, wherein said liner is further provided with a fragrance;

a conduit assembly including a union, a conduit, a first opening and a second opening, wherein said conduit is formed by connecting an edge of said upper portion to an outer side thereof, said connection between said upper portion and said outer side thereof defines said union, said union is a seam, wherein said conduit has toroid shape, said conduit is hollow, said conduit extends along a perimeter of said edge of said upper portion, said conduit has distal ends, said conduit has a first opening and a second opening in said distal ends, wherein said conduit is configured to slidably contract along a drawstring to close said liner; and a drawstring assembly including a drawstring and aglets, wherein said drawstring is configured to be inserted into said first opening or said second opening of said conduit, said drawstring ties to make a knot to secure said waste inside said liner, said drawstring has distal ends, said aglets are coupled into said distal ends, said aglets secure said knot, wherein said drawstring is made of plastic.

* * * * *